United States Patent [19]
Arcara

[11] B 3,913,403
[45] Oct. 21, 1975

[54] TEMPERATURE MEASUREMENT WITH THREE-LEAD RESISTANCE THERMOMETERS BY DUAL CONSTANT CURRENT METHOD

[75] Inventor: Samuel A. Arcara, North Wales, Pa.

[73] Assignee: Leeds & Northrup Company, North Wales, Pa.

[22] Filed: Oct. 11, 1973

[21] Appl. No.: 405,360

[44] Published under the Trial Voluntary Protest Program on January 28, 1975 as document no. B 405,360.

[52] U.S. Cl. ............... 73/362 AR; 323/7; 323/94 R
[51] Int. Cl.² ..................... G01K 7/24; H04B 3/10
[58] Field of Search...... 73/362 AR; 323/1, 7, 94 R; 340/177 VA, 210

[56] References Cited
UNITED STATES PATENTS

| | | |
|---|---|---|
| 3,447,075 | 5/1969 | Williams et al. ........... 73/362 AR X |
| 3,457,493 | 7/1969 | Shoemaker et al. .............. 307/60 X |
| 3,805,616 | 4/1974 | Sugiyama ...................... 73/362 AR |
| R27,103 | 3/1971 | Cate ....................... 73/362 AR UX |

Primary Examiner—Richard C. Queisser
Assistant Examiner—Frederick Shoon
Attorney, Agent, or Firm—William G. Miller, Jr.; Raymond F. MacKay

[57] ABSTRACT

Measurement with a three-lead resistance thermometer is made using two current sources to set up a current I in the thermometer element and each of its potential leads. A current of 2I is established in the current lead with all currents being in a direction such that the currents in the potential leads are in the same direction with respect to the thermometer element. A voltage measurement is then made across the potential leads to determine the element resistance and hence its temperature without the need for leadwire compensation.

10 Claims, 5 Drawing Figures

3,913,403

TEMPERATURE MEASUREMENT WITH THREE-LEAD RESISTANCE THERMOMETERS BY DUAL CONSTANT CURRENT METHOD

BACKGROUND OF THE INVENTION

This invention relates to the measurement of temperature by the use of resistance thermometers and more particularly to measurements using resistance thermometers of the three-lead type. Typically, temperature measurements using three-lead resistance thermometers have been made either with bridge circuits or by potentiometric methods. It is desirable to provide for a more direct method of measuring the resistance and hence the temperature detected by a resistance thermometer of the three-lead type, such as, by utilizing constant current sources as a means for producing a voltage drop across the resistance thermometer element which is a direct function of the resistance of the element and hence of the temperature being detected. Such an arrangement allows the resistance of the thermometer element to be measured by a voltmeter or the temperature to be read in engineering units on a linearizing voltmeter.

It is, of course, very simple to measure the resistance of a four-lead resistance thermometer by putting a constant current through the thermometer by way of a pair of leads (the current leads) and then measuring the voltage at the terminals of the other pair of leads (potential leads). Such an arrangement when utilizing a high resistance voltmeter is independent of lead resistance.

With a three-lead thermometer, however, the use of a single constant current source across one pair of leads and a voltage measuring device utilizing the remaining lead necessarily includes the voltage drop through the lead resistance of the lead which is connected to both the current source and the voltmeter. The leadwire resistance, of course, does not vary as a function of the temperature and therefore it would be necessary to compensate for the effect of the leadwire resistance.

It is an object of the present invention to provide a direct voltage measurement of the resistance of a resistance thermometer of the three-lead type in a manner to avoid the need for compensating for the resistance of the leadwire.

SUMMARY OF THE INVENTION

In carrying out the invention there is provided a system for producing a voltage change which is indicative of the temperature change detected by a three-lead resistance thermometer in which the three leads may be considered as including two potential leads connected to opposite ends of the resistance thermometer element and a current lead connected to one end. The system comprises means for producing currents in the resistance thermometer element, the potential leads and the current lead such that current of a certain magnitude will flow through the resistance thermometer element and each of the potential leads with a current of twice that magnitude flowing through the current lead. The current flows must necessarily be such that the flows through each of the potential leads are in the same direction with respect to the resistance thermometer element.

DESCRIPTION OF THE PREFERRED EMBODIMENTS

Figure 1:
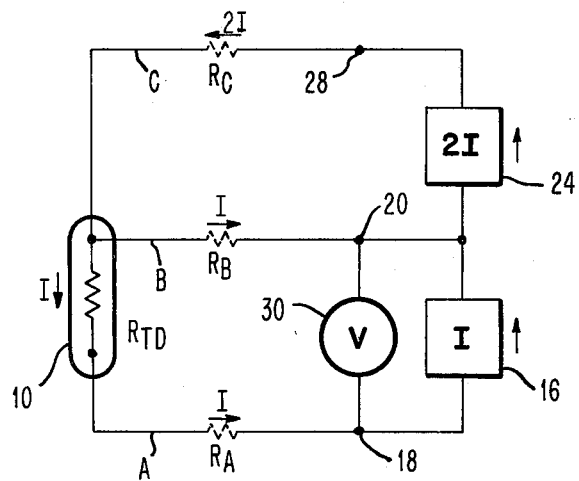
FIGS. 1–4 are circuit diagrams partially in block diagram form showing four different circuit arrangements for accomplishing the desired objective of this invention.

In FIG. 1 a three-lead resistance thermometer is shown. It includes a resistance element $R_{TD}$, which may typically be a wound resistance element, enclosed in a case 10. That element is connected by three leads, A, B and C to terminals 18, 20 and 28 which are provided for connection to measuring circuits and current sources for measurement of the temperature being detected by the element and manifested as a change in its resistance.

Two of the leads connecting to opposite ends of the resistance element, $R_{TD}$, such as leads A and B may be considered as the potential leads to the element by virtue of the fact that it is intended that those leads be utilized for measuring the potential drop across the element. The remaining lead, namely C, is typically known as the current lead since its sole function is for the purpose of carrying current through the resistance element $R_{TD}$ for generating the potential drop to be measured.

As shown in FIG. 1 the leadwire A may be considered as having a resistance $R_A$ shown symbolically in phantom. Similarly, the leadwire B has a leadwire resistance $R_B$ and the leadwire C has a resistance $R_C$. Both $R_B$ and $R_C$ are also shown in phantom to distinguish them from discrete circuit elements.

In order to measure the resistance of the resistance thermometer element $R_{TD}$ in FIG. 1 a constant current source 16 is utilized to produce a constant current flow in the direction shown by the arrow associated with the block 16. The current source 16 is connected to the potential leads A and B at their respective terminals 18 and 20 so that it tends to provide a current flow of a certain value I through the resistance thermometer element $R_{TD}$ in the direction of the arrow associated with that element.

In addition to the constant current source 16 which is connected to the potential leads, another constant current source 24 produces a constant current whose magnitude is twice the magnitude of the current produced by the source 16 and flows in a direction corresponding to the arrow associated with the block 24. The current source 24 is connected as shown in FIG. 1 to the current lead C at its terminal 28 and to the potential lead connected to the same end of the resistance thermometer element $R_{TD}$, namely lead B, at its terminal 20. Thus, the current source 24 by itself tends to produce a current flow of magnitude 2I through the loop including leads C and B.

It will be evident that the combination of the current sources 16 and 24 connected as shown in FIG. 1 results in a current flow in the potential lead B which is in the same direction with respect to the resistance thermometer element $R_{TD}$ as is the current flow in lead A. Both currents flow away from element $R_{TD}$. Thus, the voltage drop around the loop including the lead A, resistance thermometer element $R_{TD}$ and the lead B are such that there is a cancellation of the potential drops across the lead resistances $R_A$ and $R_B$ so that there is produced across the terminals 18 and 20 a voltage corresponding with the product of the current I flowing through the resistance thermometer element and the resistance of that element itself at its existing temperature. It is, therefore, possible to utilize a voltmeter 30 between the terminals 18 and 20 to make a direct voltage measurement of the voltage drop across the element $R_{TD}$ and that voltage may be appropriately converted to a resistance or a temperature measurement which is independent of the lead resistance associated with the resistance thermometer.

Typically, the resistance thermometer element $R_{TD}$ is a resistance element whose magnitude may be, for example, 25 ohms at a particular temperature such as 0° Centigrade. In that case variations of the resistance element from the value of 25 ohms would be directly indicative of the temperature in degrees Centigrade with an appropriate conversion depending on the characteristic of the resistance element itself with respect to the temperature. It will, thus, be evident that it is possible to increase the resolution of the temperature measurement with the resistance thermometer by introducing in series with the potential lead B a resistor whose value corresponds with the resistance of the resistance thermometer element $R_{TD}$ at 0° Centigrade, for example. The voltage measurement will then be in terms of resistance change from 25 ohms (0° C.) or any other value which may be selected as a base for suppressing the range of the resistance thermometer measurement. The circuit for providing a suppression is shown in FIG. 2 where the resistor $R_S$ is introduced as explained.

Figure 3:
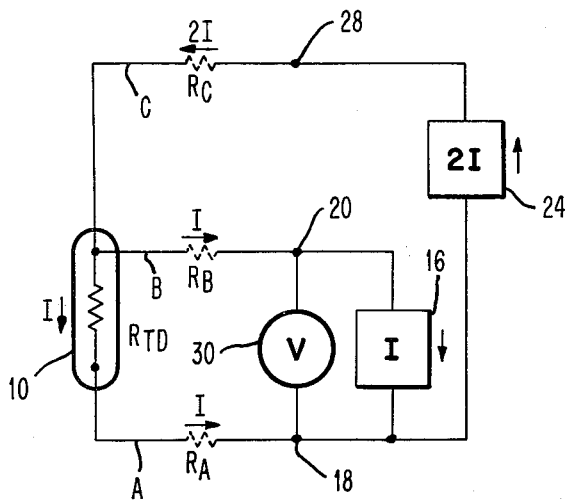

In FIG. 3 there is shown still another dual current source system for measuring the temperature of a resistance thermometer in such a way that the leadwire resistances need not be compensated for. The arrangement of FIG. 3 differs from that of FIG. 1 in that the direction of current provided by the current source 16 is reversed while the direction current provided by the other source, namely 24, is the same as that in FIG. 1. However, in FIG. 3 the source 24 is connected to the terminal 18 and 28 instead of to the terminals 20 and 28 as in FIG. 1. The arrangement of FIG. 3, however, provides current flows in the leads A, B and C in the resistance thermometer element $R_{TD}$ similar in magnitude and direction to those provided by FIG. 1, hence the measurement may be made in a similar fashion as shown in FIG. 1, namely, between the terminals 18 and 20.

Figure 4:
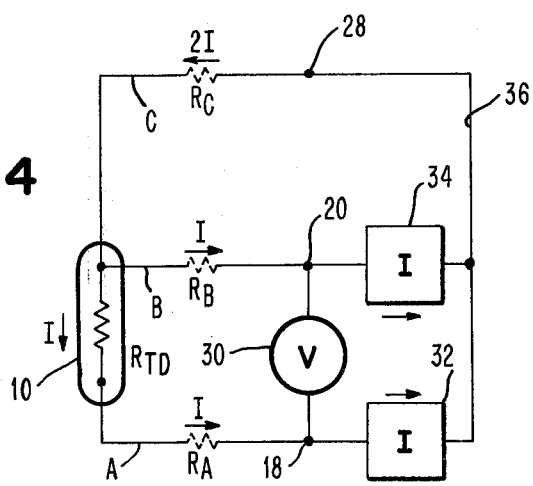

In FIG. 4 a current source 32 is connected between the terminals 18 and 28 and provides a current of magnitude I in a direction shown by the arrow associated with block 32. Similarly, a constant current source 34 connected between the terminals 20 and 28 provides a current of magnitude I in the direction indicated by the arrow associated by the block 34. Thus, the currents generated by the sources 32 and 34 add in the common connection 36 to terminals 28 to provide a current of magnitude 2I through the current lead C. This arrangment provides currents of the same magnitude and direction in the leads A, B and C and in the element $R_{TD}$ as those shown in FIGS. 1 and 3 and, therefore, provides between the terminals 18 and 20, a voltage which can be measured by the voltmeter 30 which is indicative of the potential drop across the element $R_{TD}$ and hence indicative of the temperature being detected by that element with the resistance of each of the potential leads being effective to disturb the measurement since the voltage drops through the lead resistances cancel.

Figure 2:
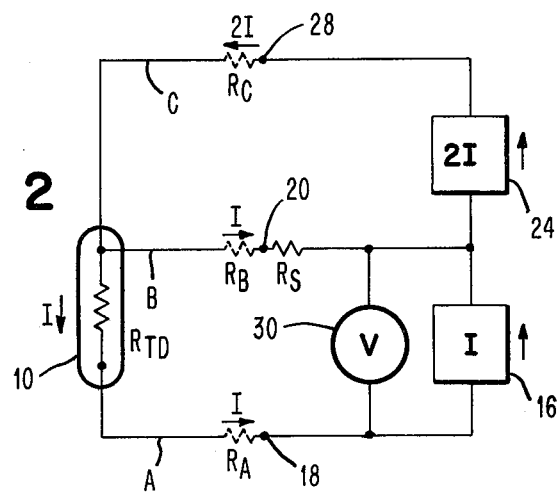

It is understood that the resistance of the lead wires A and B in each of the FIGS. 1-4 are assumed to be equal in value. In addition, it is evident that the current sources shown in FIGS. 1-4, may in all cases be reversed so as to provide currents in the opposite directions to that shown in the figures in which case the polarity of the voltage measurement made by the voltmeter would be reversed, but its reading would be uneffected. In the circuits of FIGS. 3 and 4 the resistor $R_S$ can be introduced in series with lead B as shown in FIG. 2 to suppress the range of the measurement.

Figure 5:
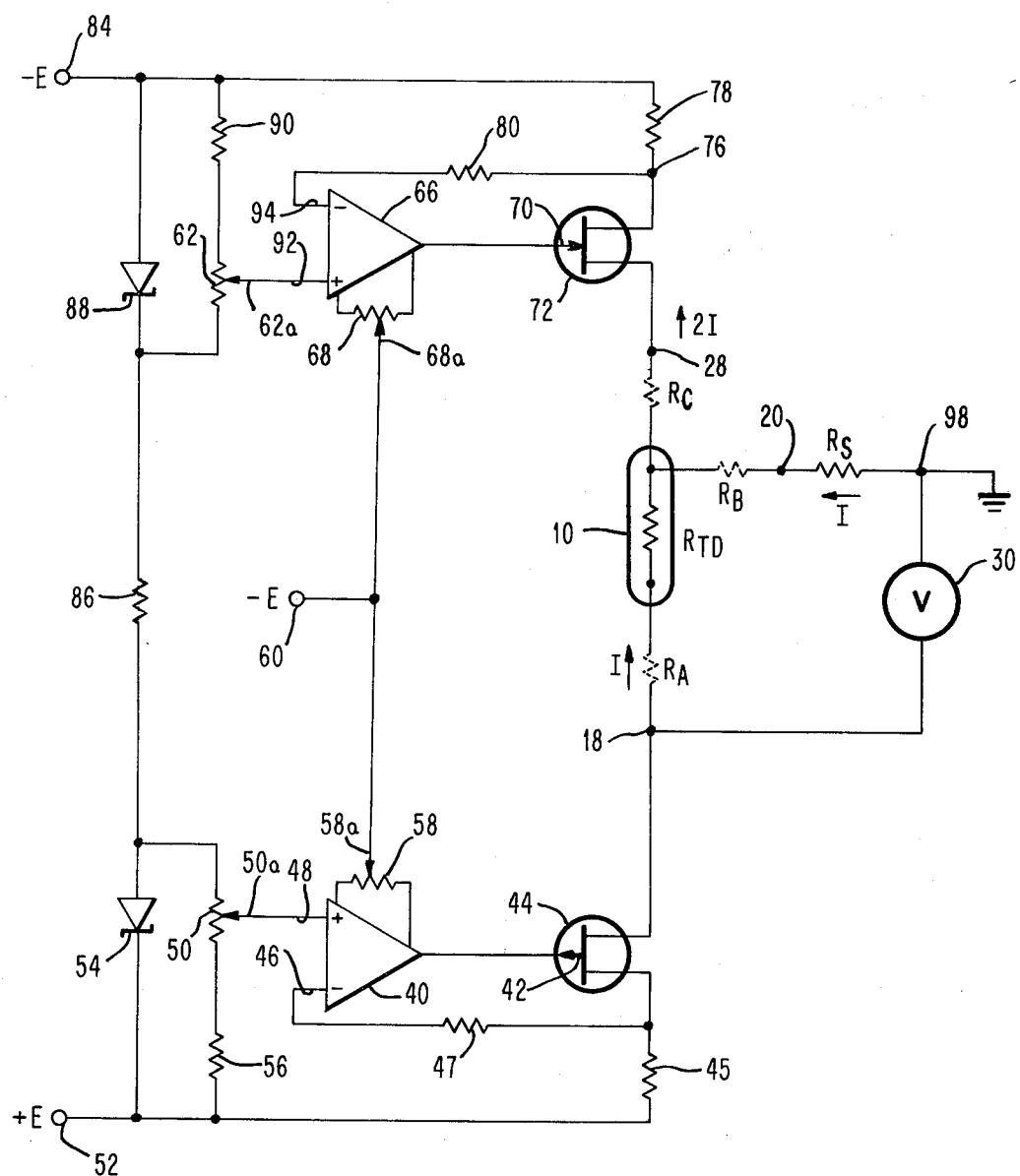
FIG. 5 shows the arrangement of FIG. 4 with circuit details of one form of the two current sources.

In FIG. 5 there is shown a more detailed circuit diagram of one form of the arrangement shown in FIG. 2 with the current sources 16 and 24 being shown in detail and with the current flows being reversed from those shown in FIG. 2. Thus, in FIG. 5 the constant current source 16 of FIG. 2 is shown as including a differential amplifier 40 having its output connected to gate 42 of the n-junction FET 44 so as to modify the current 50a. Desirably, the contact 50a is adjusted so that a resistor 45 produces through feedback resistor 47 a potential at the inverting input 46 of amplifier 40 which corresponds to the selected potential supplied at the non-inverting input 48 as determined by the position of contact 50a along the slidewire 50. With a +E supply being provided at terminal 52 there is maintained across the Zener diode 54 a fixed potential drop which may, for example, be 6.2 volts, which determines the potential across the series connected slidewire 50 and resistor 56 to establish the selected potential at contact 50a. Desirably, the contact 50a is adjusted so that a certain current of value I will flow in the source and drain of the FET 44 to terminal 18 of the resistance thermometer.

The amplifier 40 is shown as having an offset adjustment provided by resistor 58 and a potential tap 58a which is connected at terminal 60 to a supply of value —E.

With the contact 50a adjusted to provide a current of magnitude I into terminal 18 it is desirable to adjust the contact 62a on potentiometer 62 so as to produce a current of magnitude 2I from the terminal 28 of the resistance thermometer. This is accomplished with a circuit similar to that already described. It includes a differential amplifier 66 which has an offset adjustment resistor 68 connected with a potential tap 68a to the source at terminal 60, namely —E.

The output of the differential amplifier 66 to the gate 70 of the p-junction FET 72 maintains the current in the source and drain of the FET 72 at a value of 2I by way of the feedback provisions provided through the connection of the inverting input 94 of amplifier 66 to the junction 76 of the resistor 78 with the connection including a feedback resistor 80 so that the potential at 94 is maintained at a value corresponding to the potential at contact 62a. The value 2I for the current through resistor 78 is accomplished by making the value of resistor 78 approximately half the value of resistor 45.

The supply potential —E volts which is provided at terminals 84 operates in combination with the potential supplied at terminal 52 to provide through the Zener diode 54, resistor 86 and Zener diode 88, a potential across the potentiometer 62 and resistor 90 of value such that the potential supplied from contact 62a to the non-inverting input 92 of amplifier 66 provides a potential corresponding to that desired at the inverting input 94.

With the current of value I flowing into terminal 18 through the lead resistance $R_A$ and the resistance thermometer element $R_{TD}$ and with a current of value to 2I flowing out of terminal 28 there is then a current of value I flowing from the ground connection at junction 98 through the resistor $R_S$ into terminal 20 and through lead resistance $R_B$ to add to the current flowing through the resistance thermometer element $R_{TD}$ so as to produce through the lead resistance $R_C$ and out of the terminal 28 the total current 2I. The voltage measurement is then made by voltmeter 30 between the junction 98 and terminal 18.

Typical values which may be utilized in the circuit of FIG. 5 are tabulated below.

| Element | Value |
| --- | --- |
| +E | +15v. |
| −E | −15v. |
| 44 | 2N4360 |
| 45 | 5.89 K |
| 47 | 2.7 K |
| 50 | 10 K |
| 54 | Motorola 6.2v, IN 825A |
| 56 | 90.9 K |
| 58 | 10 K |
| 62 | 10 K |
| 68 | 10 K |
| 72 | Teledyne U1898 |
| 78 | 2,945 K |
| 80 | 5.6 K |
| 86 | 2.37 K |
| 88 | Motorola 6.2v, IN 825A |
| 90 | 90.9 K |
| 40 and 66 | Fairchild UA 741 |

What is claimed is:

1. A system for measuring a voltage change indicative of the temperature change detected by a three-lead resistance thermometer having three leads including potential leads connected to opposite ends of the resistance thermometer element and a current lead connected to one of said ends, comprising:
    means for producing constant currents in said element, said potential leads and said current lead such that current of a certain magnitude flows through said element and each of said potential leads and a current of twice said certain magnitude flows through said current lead with the current through each of said potential leads being in the same direction with respect to said element, and
    voltage measuring means connected between said potential leads to measure the voltage change.

2. A system as set forth in claim 1 in which said first named means includes:
    a first constant current source connected across said potential leads to tend to produce said current of said certain magnitude in said potential leads, and
    a second constant current source connected between said current lead and a potential lead for producing said current of twice said certain magnitude in said current lead.

3. A system as set forth in claim 2 in which the potential lead to which said second current source is connected is the potential lead from the same end of the element as said current lead.

4. A system as set forth in claim 2 in which the potential lead to which said second current source is connected is the potential lead from the opposite end of the element from the current lead.

5. A system as set forth in claim 1 in which said first named means includes:
    a first and second current source each connected between a different potential lead and said current lead to tend to produce said current of said certain magnitude in each of the associated potential leads in the same direction with respect to said element.

6. A system for measuring temperature with a three-lead resistance thermometer having first and second potential leads of equal resistance connecting their terminals to opposite ends of the resistance thermometer element and a current lead connecting its terminal to the end of said resistance thermometer element to which said first potential lead is connected, comprising:
    a first constant current source connected directly between the terminals of said first and second potential leads and operable to produce a current of a certain magnitude therebetween
    a second constant current source connected directly between the terminals of said current lead and said first potential lead and operable to produce twice said certain current therebetween in a direction to produce in said first potential lead a net current of said certain magnitude and opposite in direction to that which would result from said first source alone, and
    a voltage measuring means connected between the terminals of said first and second potential leads so that the voltage measured is related directly to the voltage drop across the resistance thermometer element as an indication of its temperature.

7. A system as set forth in claim 6 in which said first and second sources and said voltage measuring means are connected to the terminal of said first potential lead by way of a resistor of value corresponding to a base resistance value for said resistance thermometer element so that said voltage measurement is indicative of the temperature change from a base value corresponding with the base resistance of said resistance thermometer element.

8. A system for measuring temperature with a three-lead resistance thermometer having potential leads of equal resistance connected to opposite ends of the thermometer element and a current lead connected to one of said ends, comprising:
    a first constant current source connected to the potential leads so as to tend to produce currents of a certain magnitude through said thermometer element and each of said potential leads,
    a second constant current source connected between said current lead and that one of said potential leads connected to the same end of said thermometer element, said second constant current source being operable to tend to produce current of twice said certain magnitude through the current lead and the potential lead connected to the same end so that the net current flow in said last named potential lead is equal to said certain magnitude and is in a direction with respect to said element that is in correspondence with the direction of flow with respect to said element in the other of said potential leads, and
    a voltage measuring means connected across said potential leads so that the voltage measured is directly related to the voltage drop across the thermometer element itself as an indication of its temperature.

9. A system as set forth in claim 8 in which the potential lead connected to the thermometer element at an end in common with the connection of the current lead includes in series connection therewith a resistor of value corresponding to a base resistance value for said resistance thermometer at a particular temperature so that the voltage measurement is indicative of the temperature change from said particular temperature.

10. A system for measuring a temperature change with a three-lead resistance thermometer having first and second potential leads connected to opposite ends of the thermometer element and a current lead connected to that end of the thermometer element to which said first potential lead is connected, comprising:

a resistor of value corresponding to a base resistance value for said resistance thermometer at a particular temperature, means connecting one end of said resistor to the first potential lead, two constant current sources connected to said second potential lead, said current lead and the other end of said resistor so as to produce currents of a certain magnitude through said thermometer element, each of said potential leads, and said resistor and twice the magnitude of said certain current through the current lead so that said currents in said potential leads are in the same direction with respect to said element, and voltage measuring means connected between the second potential lead and said other end of said resistor so as to measure the voltage change across said resistance thermometer as an indication of the change in temperature of the resistance thermometer from said particular temperature.

* * * * *